United States Patent [19]

Mourey et al.

[11] Patent Number: 4,598,978
[45] Date of Patent: Jul. 8, 1986

[54] SCREEN OF A DISPLAY DEVICE USING A MIXED THERMAL AND ELECTRICAL EFFECT

[75] Inventors: Bruno Mourey; Michel Hareng; Lydie Thirant, all of Paris, France

[73] Assignee: Thomson CSF, Paris, France

[21] Appl. No.: 468,712

[22] Filed: Feb. 22, 1983

[30] Foreign Application Priority Data

Mar. 9, 1982 [FR] France ................................. 8203937

[51] Int. Cl.$^4$ ................................................ G02F 1/13
[52] U.S. Cl. ................................ 350/351; 350/339 R; 350/350 S
[58] Field of Search ................... 350/351, 350 S, 339 R

[56] References Cited

U.S. PATENT DOCUMENTS 3,410,999  11/1968  Fergason et al. .
3,435,445  3/1969   Clendinning et al. .
4,202,010  5/1980   Hareng et al. .................. 350/351 X
4,390,244  6/1983   Hareng et al. ...................... 350/333

FOREIGN PATENT DOCUMENTS 0065397  11/1982  European Pat. Off. ............ 350/351

OTHER PUBLICATIONS

Chang, I. F. et al., "Low-Power Laser-Addressed Liquid Crystal Projection Display Device," *IBM Tech. Disc. Bull.*, vol. 24, No. 3 (Aug. 1981) pp. 1570–1572.
Keilmann, F., "Infrared Interferometry with a $CO_2$ Laser Source and Liquid Crystal Detection," *Applied Optics*, vol. 9, No. 6 (Jun. 1970) pp. 1319–1322.

*Primary Examiner*—John K. Corbin
*Assistant Examiner*—Richard F. Gallivan
*Attorney, Agent, or Firm*—Cushman, Darby & Cushman

[57] ABSTRACT

A screen of a visual display device combining a thermal effect and an electrical effect for controlling an electro-optical material is obtained by replacing the glass plate of the screen facing the heating strips contributing to the thermal effect by a plate with better thermal insulation characteristics than glass, in order to reduce the control power.

5 Claims, 3 Drawing Figures

SCREEN OF A DISPLAY DEVICE USING A MIXED THERMAL AND ELECTRICAL EFFECT

BACKGROUND OF THE INVENTION

The present invention relates to visual display devices comprising an electrooptical material reacting to a mixed thermal and electrical effect and used for the display or production of images.

It is now well known to use a mixed thermal and electrical effect for controlling the orientation of molecules forming a liquid crystal, cf. particularly French Pat. No. 77 13 738, published under No. 2 389 955 and filed on May 5, 1977 by the Applicant company. This effect can also be used for controlling other electrooptical materials or for improving the performances of devices using them. This led the present Applicant company to file a French patent application under No. 81 23 437 on Dec. 15, 1981. This application proposes the reduction of the response time of an electrochromic display device and ensure a more definite threshold of the electrochromic effect by the combined use of a thermal effect and an electrical effect.

Heat can be supplied by a laser beam or the passage of an electrical current in the heating strips. The latter solution is being increasingly used, particularly in matrix display smectic liquid crystal devices. In a device of this type, it is advantageous for economy reasons and in order to reduce to the maximum the response time of the device, that the thermal energy supplied is not wasted in the plate facing the heating strips. However, when the addressing of an area of the screen corresponding to a heating strip is finished, it is also necessary that the heat accumulated in this area is removed by the plate supporting the corresponding heating strip. At present this is not carried out in display devices, where the plates supporting the electrodes forming a display matrix are either of the same nature, or are not chosen as a function of the aforementioned criteria.

In order to obviate these disadvantages, the use is proposed in these devices of plates chosen as a function of their thermal conductivity, the plate facing the heating strips having to dissipate a minimum quantity of the heat supplied to the electrooptical medium and the plate supporting said strips permitting a reasonable heat removal after the supply of heat has been stopped.

BRIEF SUMMARY OF THE INVENTION

The invention therefore relates to a screen for a thermoelectrically controlled display device comprising a first and a second plate, whereof at least one is transparent, said plates enclosing an electrooptical material layer reacting to a mixed thermal and electrical effect. Said first plate supporting on its inner face at least one electrode and said second plate supporting on its inner face at least one heating electrode, said electrodes making it possible to apply an electrical control field to the material, wherein the first plate has on the electrooptical material side at least one layer of an insulating material, whose thermal conductivity is below $2.5 \times 10^{-3}$ cal/cm.s.°C. and whose thickness is at least equal to three times the thickness of the layer of electrooptical material.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

The following description relates to liquid crystal display screens, which mainly use this type of display. However, other display screens, in which the display is obtained by a mixed electrical and thermal effect also fall within the scope of the invention.

Figure 1:
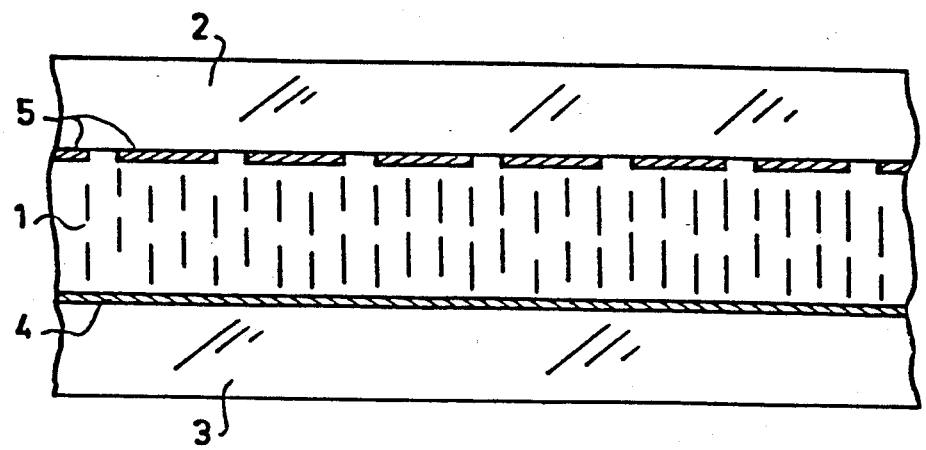
FIG. 1 a part sectional view of a visual display screen.

FIG. 1 is a part sectional view of a smectic liquid crystal display screen. The liquid crystal 1 having a smectic phase is enclosed between two plates 2 and 3, e.g. made from glass. Plate 2 supports a series of parallel electrodes 5 and plate 3 a series of parallel electrodes 4 intersecting electrodes 5, e.g. orthogonally. A typical example of a smectic liquid crystal which can be used is cyanooctyl-4,4'-diphenyl of formula

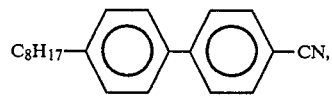

which has the following phase transitions:

The liquid crystal layer 1 is inserted between two plates 2 and 3 in an approximately 10 to 15 microns wide space defined by now shown shims. Plates 2 and 3 can have a thickness of several millimeters, which is much thicker than the liquid crystal. If the system functions by transparency, electrodes 4 and 5 are made from a transparent material, e.g. a tin or indium oxide, or a mixture of these two oxides. If the system functions in reflection, one of the two groups of electrodes is transparent and the other is made from a light-reflecting material, e.g. aluminium. It is advantageous to choose one of the two groups of electrodes for the application of the electrical field for heating the liquid crystal and also for forming the system of heating strips.

Thermal calculations using a unidimensional model make it possible to obtain temperature profiles in the screens along an axis transverse thereto. These calculations related to two screens, whose smectic liquid crystal layer is of the aforementioned cyanooctyl-4,4'-diphenyl and which has a thickness of 12 microns. More specifically, the screens are of the type shown in FIG. 1. On passing from bottom to top, it is possible to see a transparent plate 3, aluminium electrodes 4 permitting the heating of the liquid crystal by the passage of an electrical current and forming the lines or rows of the display matrix, the aforementioned smectic liquid crystal 1, transparent electrodes 5 to which are applied the video voltages of the device and which form the columns of the display matrix and a transparent plate 2. Thus, the screen operates in reflection, light penetrating by plate 2, traversing transparent electrodes 5 and the liquid crystal and being reflected on electrodes 4. From the thermal standpoint, the line and column electrodes have a negligible thickness and account need only be taken of the lower plate 3, the liquid crystal layer and the upper plate 2. The heat flux is supplied to the lower plate—liquid crystal interface. In order to ensure a satisfactory operation of the screen, it is necessary to apply to the heating lines an energy such that the temperature of all parts of the liquid crystal layer is equal to or exceeds the mesomorphic—isotropic transition temperature of the liquid crystal used.

When a line is heated, the heat given off propagates by conduction in two main directions, namely towards plate 3 on the one hand and towards the liquid crystal and plate 2 on the other. As the supply of heat only contributes to the heating of the liquid crystal, it is not advantageous for it to be needlessly dissipated in plates 2 and 3 and if no such needless dissipation takes place the heating power can be limited and the complexity of the control electronics reduced. In this type of device, the video voltage is applied during the return of the liquid crystal from the isotropic phase to the smectic phase, i.e. after interruption of the heating of the line corresponding to the element of the screen to be controlled. From the display rate standpoint, it is necessary that the phase transition takes place rapidly, so that plate 3 can remove a certain quantity of heat in a proportional period of time. Thus it is advantageous to choose plates 2 and 3 as a result of their thermal conductivity, whereby the plate facing the heating strips must have a lower thermal conductivity than the plate which supports them.

Temperature profiles have been plotted for both cases: firstly when the plate facing the heating strips is made from glass, then when said plate is made from a material having better thermal insulation than glass, i.e. Plexiglass. The thermal characteristics of these materials are as follows:

|  | Thermal conductivity (Cal/cm · s · °C.) | Density (g/cm³) | Heat capacity (Cal/g × °C.) |
|---|---|---|---|
| Liquid crystal | $4.4 \times 10^{-4}$ | 1 | 0.3 |
| Glass | $2.5 \times 10^{-3}$ | 2.5 | 0.2 |
| Plexiglass | $5 \times 10^{-4}$ | 1.2 | 0.4 |

Figure 2:
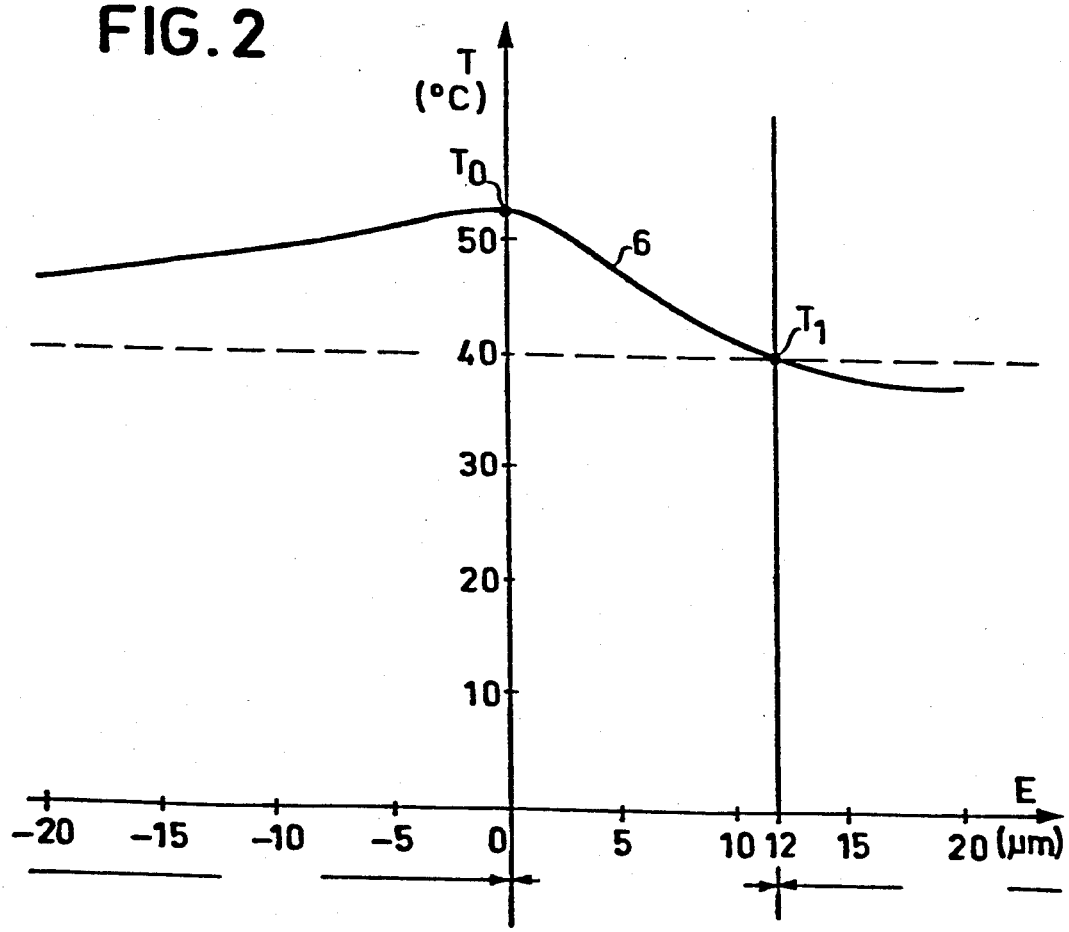
FIGS. 2 and 3 graphs showing temperature profiles.

FIG. 2 is a graph showing the temperature profile along the transverse axis of a display screen. This profile corresponds to a screen, whose plates 2 and 3 are made from glass and whose other characteristics have already been mentioned on the graph of FIG. 2. The ordinate axis represents the temperature T in degrees C. within the screen, whilst the abscissa axis represents the thickness of screen E in microns. The origin of the thicknesses is taken at the interface constituted by plate 3 and heating lines 4.

Due to the location of the heating strips, a temperature gradient is established in the liquid crystal layer when using the screen. The comparison of the two types of screen takes place by taking as a reference the time $\tau$ necessary for ensuring that all the points of the liquid crystal reach the isotropy temperature. In the case of FIG. 2, the isotropy temperature $T_I$ of the liquid crystal of 40° C. is reached at the end of time $\tau$ for a heating power $P_1$. Curve 6 gives the temperature profile within the screen. This curve has a more marked gradient in the area corresponding to the liquid crystal than in the areas corresponding to plates 2 and 3, due to the inferior thermal conductivity of the liquid crystal compared with glass. In order to reach the isotropy temperature $T_I$ at the interface between the liquid crystal and plate 2 in a time $\tau$, it was necessary to raise the facing heating strip to a temperature $T_o = 52.7°$ C., i.e. a temperature difference between the two faces of the liquid crystal layer of 12.7° C.

Figure 3:
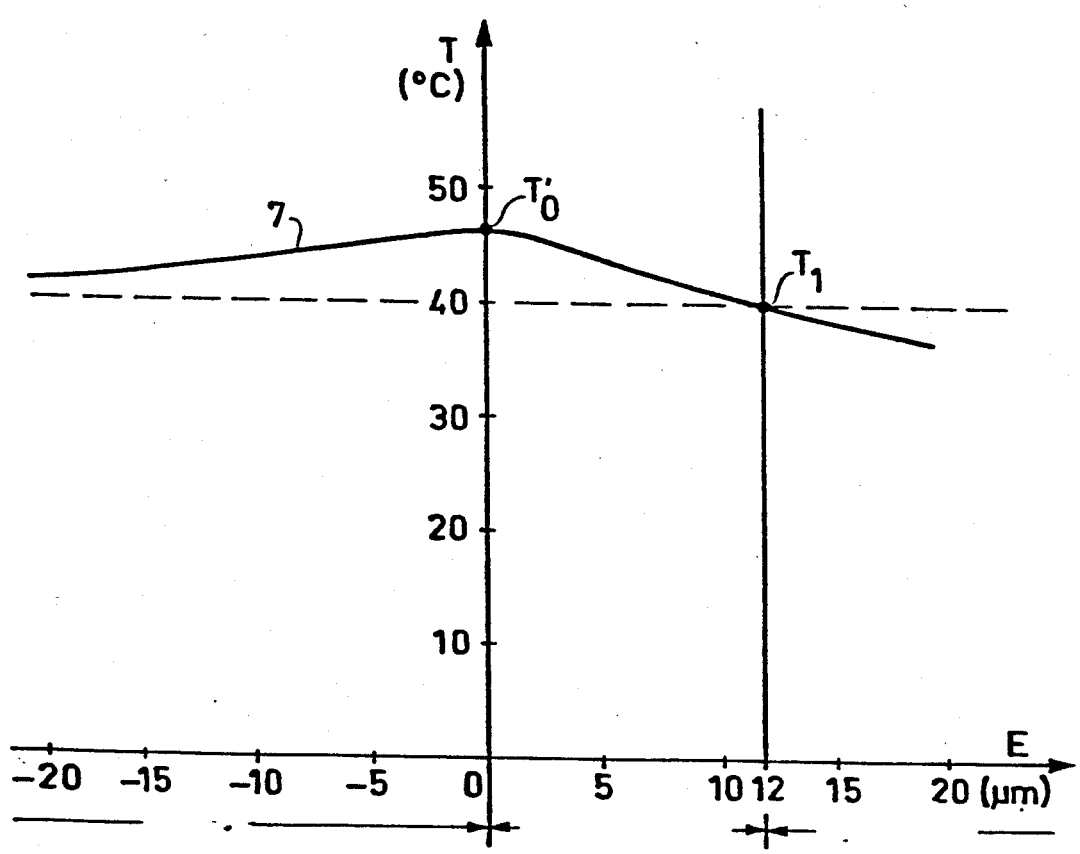

FIG. 3 is a graph showing the temperature profile along the transverse axis of a display screen identical to that of FIG. 1, but in which the glass plate 2 has been replaced by a Plexiglass (thermoplastic) plate. Plexiglass thermoplastic is a poor thermal conductor, as can be gathered from the above table. It is an inferior conductor to glass (approximately 5 times) and the liquid crystal used. The graph of FIG. 3 has been obtained for a time $\tau$ of applying the heating current and a heating power $P_2$ in such a way as to reach the isotropy temperature $T_I$ at the interface between the liquid crystal and plate 2. Curve 7 gives the configuration of the temperature profile. It can be seen that the temperature of the heating strip used is $T_o' = 46.1°$ C. In this case, the heating power $P_2$ applied is approximately 30% lower than when plate 2 was made from glass ($P_1$). The application time of the video voltage, which is mainly determined by the thermal leakage of the lower plate remains substantially unchanged.

The use of a more thermally insulating material for plate 2 facing the heating strips than for plate 3 which supports them tends to block the heat transfer from the liquid crystal to plate 2 and consequently makes it possible to reduce heat losses. For the same operation, the presence of this material makes it possible to use a significantly larger control power than that required when the two plates are made from a material like that of plate 3.

The invention more particularly applies to screens with a relatively slow refreshening of the elementary display points, e.g. the hereinafter described smectic liquid crystal screen. This screen is square, has side lengths of 10 cm and is used in reflection. Its structure has already been described relative to FIG. 1. The heating electrodes 4 are placed on plate 3 and are formed by aluminium strips in order to reflect the incident light penetrating the screen through plate 2. Electrodes 5 are transparent and can be made from a mixed tin and indium oxide. The two systems of electrodes 4, 5 intersect in substantially orthogonal directions. The intersection of an electrode 4 and an electrode 5 defines an elementary display point. In the chosen embodiment, each system consists of 256 electrodes, which define display points with a lateral dimension of approximately 400 microns. The other geometrical characteristics of the screen are as follows: thickness of substrate 3 supporting heating electrodes 3 mm and thickness of facing plate 2, 1.5 mm. The smectic liquid crystal layer has a thickness of 12 microns and is formed from cyanooctyl-4,4'-diphenyl, whose characteristics have been described hereinbefore. The heating current is applied for 10 ms, the control video voltage for 10 ms and information refreshment takes place every 5 seconds. The relationship existing between the thickness of the liquid crystal layer and the minimum addressing time for which there is a start of heating of the plate facing the heating electrodes can be obtained on the basis of the equation for diffusing a heat flux into a material:

$$x = 2\sqrt{\alpha \cdot t}\,.$$

In this equation x is the abscissa in cm along the heat flux propagation axis, $\alpha$ is the diffusivity of the material in cm$^2$/s and t the heating time. In another form, the equation gives the time at the end of which a face-heated layer starts to transmit heat to its other face:

$$t = \frac{x^2}{4\alpha}\,.$$

The diffusivity is the ratio of the heat conduction to the heat capacity, so that for the liquid crystal in question, we obtained:

$$\alpha = \frac{4.4 \times 10^{-4}}{0.3} \simeq 1.5 \times 10^{-3}\,\text{cm}^2/\text{s}.$$

The time t at the end of which the plate facing the heating electrodes is reached by the heat flux is t=0.24 ms for a liquid crystal layer thickness of 12 microns. In the case of a heat application time of 10 ms, it is therefore necessary for plate 2 to be very refractory in order to obviate any heating leakage of this side of the screen, so that it is necessary to use Plexiglass (thermoplastic) instead of glass.

In order that the Plexiglass (thermoplastic) layer is effective, its thickness must be at least equal to three times the thickness of the liquid crystal layer, so that it can correctly fulfil its function of heat store. In the case where plate 2 is formed by two layers, namely a glass layer as the substrate and an inner coating having better insulating characteristics than the substrate, said coating can have a minimum thickness corresponding to three times the thickness of the liquid crystal layer in order to be effective.

By replacing the glass plate facing the heating strips by a more insulating plate such as Plexiglass in the screens of visual display devices, the invention brings about the advantage of reducing the control power of such screens. Thus, the invention leads to control power economies and consequently to a reduction in the overall dimensions and costs of systems using this control power.

What is claimed is:

1. A screen for a thermoelectrically controlled display device comprising a first and a second plate, with at least one of said first and second plates being transparent, said plates enclosing an electro-optical material layer for reacting to a mixed thermal and electrical effect, said first plate supporting on its inner face at least one electrode and said second plate supporting on its inner face at least one heating electrode, said electrodes enabling the application of an electrical control field to said electro-optical material, said first plate having on the side facing said electro-optical material at least one layer of a thermal insulating material having a thermal conductivity below 2.5.10$^{-3}$ Cal/cm.s.°C. and having a thickness at least equal to three times the thickness of said layer of electro-optical material, said first plate having a lower thermal conductivity than said second plate enabling said first plate to limit heat loss from said electro-optical material and said second plate to proportionately remove a predetermined amount of heat.

2. A screen according to claim 1, wherein said electrode form intersecting electrodes systems.

3. A screen according to claim 1, wherein said first plate is entirely formed by said thermal insulating material.

4. A screen according to claim 3, wherein said first plate is made from Plexiglass (thermoplastic) and said second plate is made from glass.

5. A screen according to claim 1, wherein said electro-optical material is a liquid crystal having a smectic phase.

* * * * *